US012160801B2

United States Patent
Tian et al.

(10) Patent No.: US 12,160,801 B2
(45) Date of Patent: Dec. 3, 2024

(54) DEVICE, SYSTEM, AND METHOD FOR DEVICE EMULATION AT INCIDENT LOCATIONS

(71) Applicant: MOTOROLA SOLUTIONS, INC., Chicago, IL (US)

(72) Inventors: Yong Tian, Beijing (CN); Jun Jiang, Beijing (CN); Xun Fei, Beijing (CN); Dong Zhao, Beijing (CN); Hai-Qing Hu, Beijing (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 372 days.

(21) Appl. No.: 17/790,935

(22) PCT Filed: Jan. 31, 2020

(86) PCT No.: PCT/CN2020/074087
§ 371 (c)(1),
(2) Date: Jul. 5, 2022

(87) PCT Pub. No.: WO2021/151236
PCT Pub. Date: Aug. 5, 2021

(65) Prior Publication Data
US 2023/0041276 A1    Feb. 9, 2023

(51) Int. Cl.
*H04W 4/10*    (2009.01)
*H04W 48/18*    (2009.01)
*H04W 60/04*    (2009.01)

(52) U.S. Cl.
CPC ............. *H04W 4/10* (2013.01); *H04W 48/18* (2013.01); *H04W 60/04* (2013.01)

(58) Field of Classification Search
CPC ....... H04W 4/10; H04W 48/18; H04W 60/04; H04L 67/59; H04L 67/08
See application file for complete search history.

(56) References Cited

U.S. PATENT DOCUMENTS 6,112,074 A    8/2000  Pinder
9,338,404 B1    5/2016  Egeler et al.
(Continued)

FOREIGN PATENT DOCUMENTS

CN    104918220 A    9/2015
CN    104955001 A    9/2015
(Continued)

OTHER PUBLICATIONS

"International Search Report", mailed Oct. 27, 2020, issued in corresponding PCT Application No. PCT/CN2020/074087, filed Jan. 31, 2020.
(Continued)

*Primary Examiner* — Tejis Daya
(74) *Attorney, Agent, or Firm* — PERRY + CURRIER, INC.

(57) ABSTRACT

Example devices, systems, and methods for emulating a PTT device at an incident location are provided. An example server receives a request for a remote push-to-talk (PTT) device to be emulated at a target location in a vicinity of an incident, selects local communication infrastructure that supports public safety services for local PTT devices located near the target location, and transmits, to the local communication infrastructure, instructions for the local communication infrastructure to register an emulated PTT device as a proxy for the remote PTT device at the target location.

20 Claims, 6 Drawing Sheets

(56) References Cited

U.S. PATENT DOCUMENTS

| | | | | |
|---|---|---|---|---|
| 2008/0171567 A1* | 7/2008 | Kossi | .................... | H04W 88/04 |
| | | | | 455/518 |
| 2009/0163171 A1* | 6/2009 | Sporel | ..................... | H04L 67/52 |
| | | | | 455/404.2 |
| 2010/0162149 A1 | 6/2010 | Sheleheda et al. | | |
| 2014/0233447 A1* | 8/2014 | Ofir | ....................... | H04W 76/45 |
| | | | | 370/312 |
| 2018/0095607 A1 | 4/2018 | Proctor | | |
| 2019/0268566 A1 | 8/2019 | Firpo et al. | | |

FOREIGN PATENT DOCUMENTS

| | | |
|---|---|---|
| CN | 105338500 A | 2/2016 |
| EP | 3496432 A1 | 6/2012 |
| WO | 2016126728 A1 | 8/2016 |

OTHER PUBLICATIONS

Bischoff, Paul, "BEST VPNs For Netflix: Get Any Version of Netflix Anywhere", published Oct. 31, 2019, https://arquivo.pt/wayback/20191205234219/https://www.comparitech.com/blog/vpn-privacy/netflix-vpn-unblock-proxy-error/.

* cited by examiner

DEVICE, SYSTEM, AND METHOD FOR DEVICE EMULATION AT INCIDENT LOCATIONS

BACKGROUND OF THE INVENTION

In public safety operations, law enforcement officers and other first responders may communicate with one another over wide-ranging service areas using push-to-talk (PTT) devices. Communication capability and other functionality for PTT devices is supported by communication infrastructure, including radio towers, back-end servers, and other communication infrastructure, spread throughout these service areas. These service areas may be organized by geofences into smaller areas in which smaller groups of PTT device users may cooperate.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
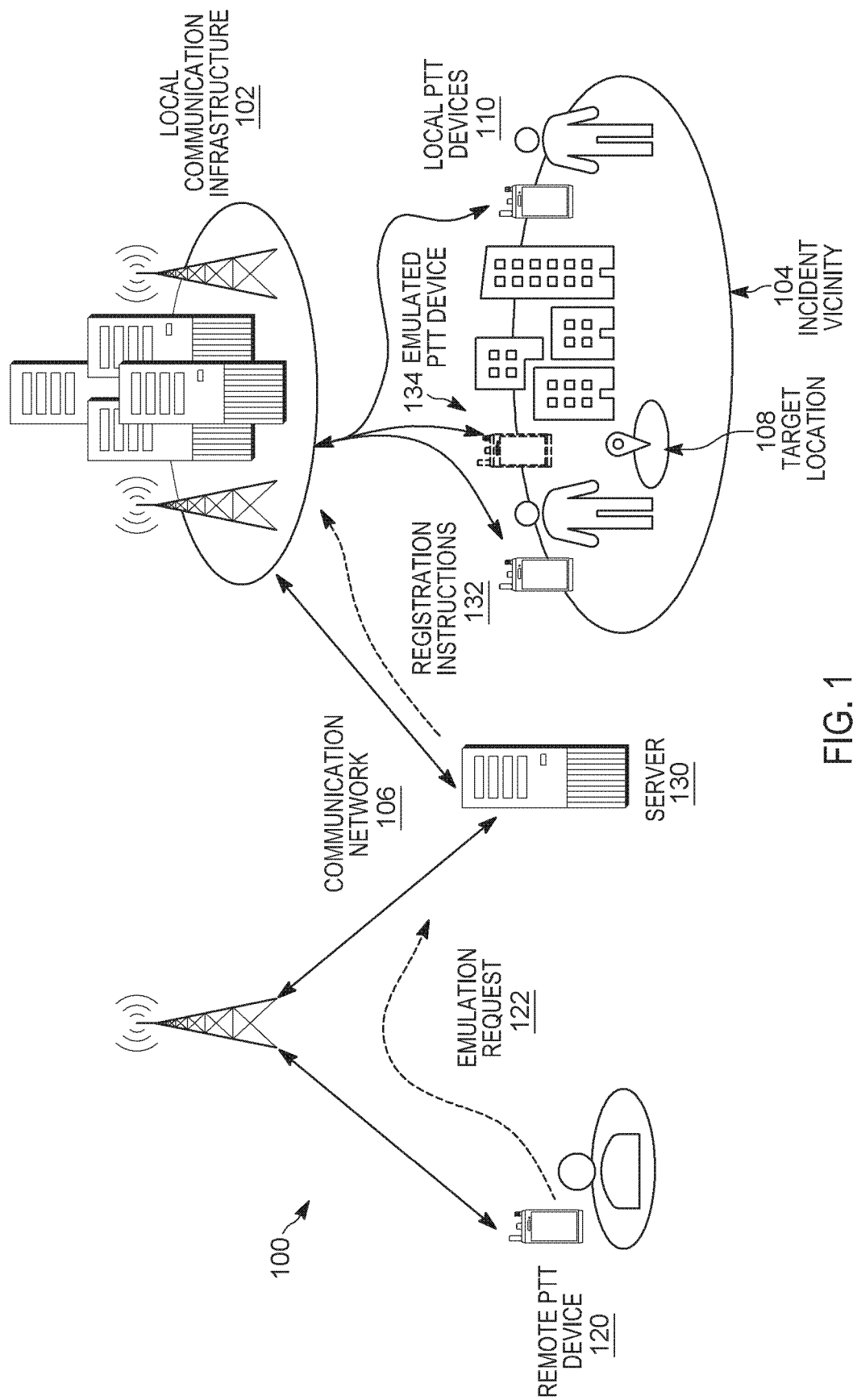
FIG. 1 is a schematic diagram of an example system for emulating a push-to-talk (PTT) device at an incident location, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An incident that calls for a public safety operation may take place in an area which is lacking in specific personnel at the time of the incident. For example, an incident may take place in an area in which there is no qualified incident commander that is able to manage the incident within a reasonable period of time. As another example, any incident that necessitates the involvement of a specialist (e.g., a hostage negotiator) may take place in an area in which no such specialist is nearby.

Under such circumstances, the assistance of qualified personnel may be obtained remotely through a telepresence system (e.g., video conferencing) or other long-distance communications system. However, such telepresence and long-distance communications technologies may not seamlessly integrate with the communication infrastructure that supports push-to-talk (PTT) devices frequently used by first responders. Lack of integration with this communication infrastructure may lead to miscommunication or other difficulties that frustrate cooperation with first responders who are physically present at the incident.

Systems, methods, and devices are described herein in which a remote PTT device that is not in the vicinity of an incident location may be emulated in the communication infrastructure that supports the incident location as a proxy for the remote PTT device. The communication infrastructure registers the emulated PTT device as if it were physically present at a target location within the vicinity of the incident, and treats the emulated PTT device as it would treat an actual PTT device in terms of location (e.g., geofencing and location mapping), communication (e.g., talk groups), role (e.g., talk group selection and priority), and other features supported by the communication infrastructure at the incident location. Thus, an incident commander or other specialist personnel who is remote from an incident may cooperate with first responders at the incident location through a remote PTT device as if the remote PTT device were physically present at the incident.

An aspect of the present specification provides a method for emulating a PTT device at an incident location comprising: receiving, at a server, a request for a remote push-to-talk (PTT) device to be emulated at a target location in a vicinity of an incident; selecting, at the server, local communication infrastructure that supports public safety services for local PTT devices located near the target location; and transmitting, from the server to the local communication infrastructure, instructions for the local communication infrastructure to register an emulated PTT device as a proxy for the remote PTT device at the target location.

Another aspect of the present specification provides a server for emulating a PTT device at an incident location comprising: a communication unit; and a controller configured to: receive a request for a remote push-to-talk (PTT) device to be emulated at a target location in a vicinity of an incident; select local communication infrastructure that supports public safety services for local PTT devices located near the target location; and transmit, to the local communication infrastructure, instructions for the local communication infrastructure to register an emulated PTT device as a proxy for the remote PTT device at the target location.

Attention is directed to FIG. 1, which depicts an example system 100 for emulating a PTT device at an incident location. The system 100 includes local communication infrastructure 102 that support public safety services for the local PTT devices 110. The local communication infrastructure 102 may include radio towers, back-end servers, and other communication infrastructure. The local communication infrastructure 102 may form part of a larger network of communication infrastructure that supports PTT devices across a larger service area.

The local communication infrastructure 102 supports a communication network 106, which may include one or more of a narrow band network (e.g., a land mobile radio (LMR) network), a broadband network (e.g., a Long Term Evolution (LTE) network), and/or any other suitable network, over which local PTT devices 110 located in a vicinity 104 of an incident communicate with one another. The public safety services that local communication infrastructure 102 supports may include a talk group for the local PTT devices 110, location-tracking of the local PTT devices 110, PTT device registration services, geofencing, dynamic updating, and other services to support PTT devices.

The system 100 further includes a remote PTT device 120 that is remote from the vicinity 104 of the incident. The remote PTT device 120 may include a remote PTT device used by an incident commander or other specialist personnel (e.g., hostage negotiator, explosives specialist) whose assistance may be valuable to resolve the incident that is taking place. The remote PTT device 120 may be located at a command center, at another incident location, or at any other location that is remote from the vicinity 104 of the incident.

The system 100 further includes a server 130 that coordinates emulation of the remote PTT device 120 at a target location 108 in the vicinity 104 of the incident, thereby enabling the remote PTT device 120 to operate as if it were physically present in the vicinity 104 of the incident.

In operation, the remote PTT device 120 makes, and the server 130 receives, a request 122 for the remote PTT device 120 to be emulated at the target location 108. In some examples, the remote PTT device 120 may transmit the request 122 over the communication network 106. In other examples, the remote PTT device 120 may transmit the request 122 over another network of a more distant service area via other communication infrastructure that is in communication with the local communication infrastructure 106 as part of a larger network. In still other examples, the remote PTT device 120 may transmit the request 122 over one or more computing networks, including the internet, where, for example, the remote PTT device 120 does not have access to the communication network 106 or the larger network thereof.

The server 130 is configured to select the local communication infrastructure 102 that supports public safety services for the local PTT devices 110 located near the target location 108. That is, depending on where the target location 108 is located, the server 130 may selects an appropriate set of local communication infrastructure 102 that supports PTT devices in the area.

The server 130 is configured to transmit, to the local communication infrastructure 102, instructions 132 for the local communication infrastructure 102 to register an emulated PTT device 134 as a proxy for the remote PTT device 120 at the target location 108. In other words, the instructions 132 cause the local communication infrastructure 102 to generate a record for the emulated PTT device 134 and to appropriately populate any appropriate data fields that would be populated had the remote PTT device 120 been physically present at the target location 108.

For example, where one of the public safety services supported by the local communication infrastructure 102 includes a talk group for the local PTT devices 110, registration of the remote PTT device 120 at the target location 108 may cause the local communication infrastructure 102 to register the emulated PTT device 134 as a member of the talk group. Thus, the remote PTT device 120 may receive and transmit communications to/from the talk group.

While the remote PTT device 120 may receive and transmit communications to/from a talk group at the incident location, the remote PTT device 120 may continue to receive and transmit communications to/from others talk groups of which the remote PTT device 120 is a member, including talk groups in the vicinity of the actual location of the remote PTT device 120. The remote PTT device 120 may switch lines of communication between such talk groups, such as, for example, through use of a communication channel knob, touch screen selection, or similar. Thus, the user of the remote PTT device 120 may multitask to manage an incident remote from the remote PTT device 120 while managing an incident at which the remote PTT device 120 is physically present.

Where the remote PTT device 120 is near (yet outside) the vicinity 104, and therefore has access to the local communication infrastructure 102, the local communication infrastructure 102 routes such communications to/from the remote PTT device 120. For example, the remote PTT device 120 may be located at the east end of a city, whereas the incident may be taking place at the west end of the city, and both the east and west ends of the city may be supported by the same local communication infrastructure 102. However, the east and west ends of the city may be part of different geofences, and thus it may be advantageous for the remote PTT device 120 to be emulated within the vicinity 104 so that the remote PTT device 120 may take part in activities taking place within the geofence covering the vicinity 104.

In other examples, where the remote PTT device 120 is more distant from the incident location, and does not have direct access to the local communication infrastructure 102, but has access to other "remote" communication infrastructure located near the remote PTT device 120 which is part of a larger network of communication infrastructure with the local communication infrastructure 102, the local communication infrastructure 102 may route communication between the remote PTT device 120 and the talk group through such "remote" communication infrastructure. In such examples, the server 130 may transmit an actual (i.e., physical) location of the remote PTT device 120 to the local communication infrastructure 102 so that the local communication infrastructure 102 may communicate with the "remote" communication infrastructure accordingly.

In still other examples, where the remote PTT device 120 is especially distant from the incident location, and the remote PTT device 120 may only access the local communication infrastructure 102 through the internet or another network, the server 130 itself may route communications between the remote PTT device and the talk group. That is, the server 130 may acts a bridge between the local communication infrastructure 102 and another communication network (e.g., the internet) to route communications between the remote PTT device 120 and other PTT devices at the incident location.

The public safety services supported by the local communication infrastructure 102 may include role management whereby a PTT device may be assigned a roles (e.g., firefighter, law enforcement officer, medical technician, incident commander). The local communication infrastructure 102 may treat a particular PTT device differently based on its assigned role. For example, the local communication infrastructure 102 may support a range of geofences for firefighters and another range of geofences for law enforcement officers. The local communication infrastructure 102 may register a PTT device which is assigned the role "firefighter" to a new talk group when it enters a new "firefighter" geofence, but may take no action when a PTT device which is assigned the role "law enforcement officer" enters the same geofence. As another example, the local communication infrastructure 102 may enforce talk group priority (i.e., "floor control"), in which PTT devices which are assigned a higher priority in a particular talk group may be permitted to interrupt communications from other PTT devices of lower priority. In such examples, the server may be configured to transmit instructions for the local communication infrastructure 102 to register the emulated PTT device 134 as having a designated role. The designated role may afford the emulated PTT device 134 a particular priority in a talk group, or may affect the way in which the local communication infrastructure 102 treats the emulated PTT device 134 in other ways, such as, when the emulated PTT device 134 crosses a geofence. The designated role may be requested by the remote PTT device 120 as part of the emulation request 122.

Figure 5:
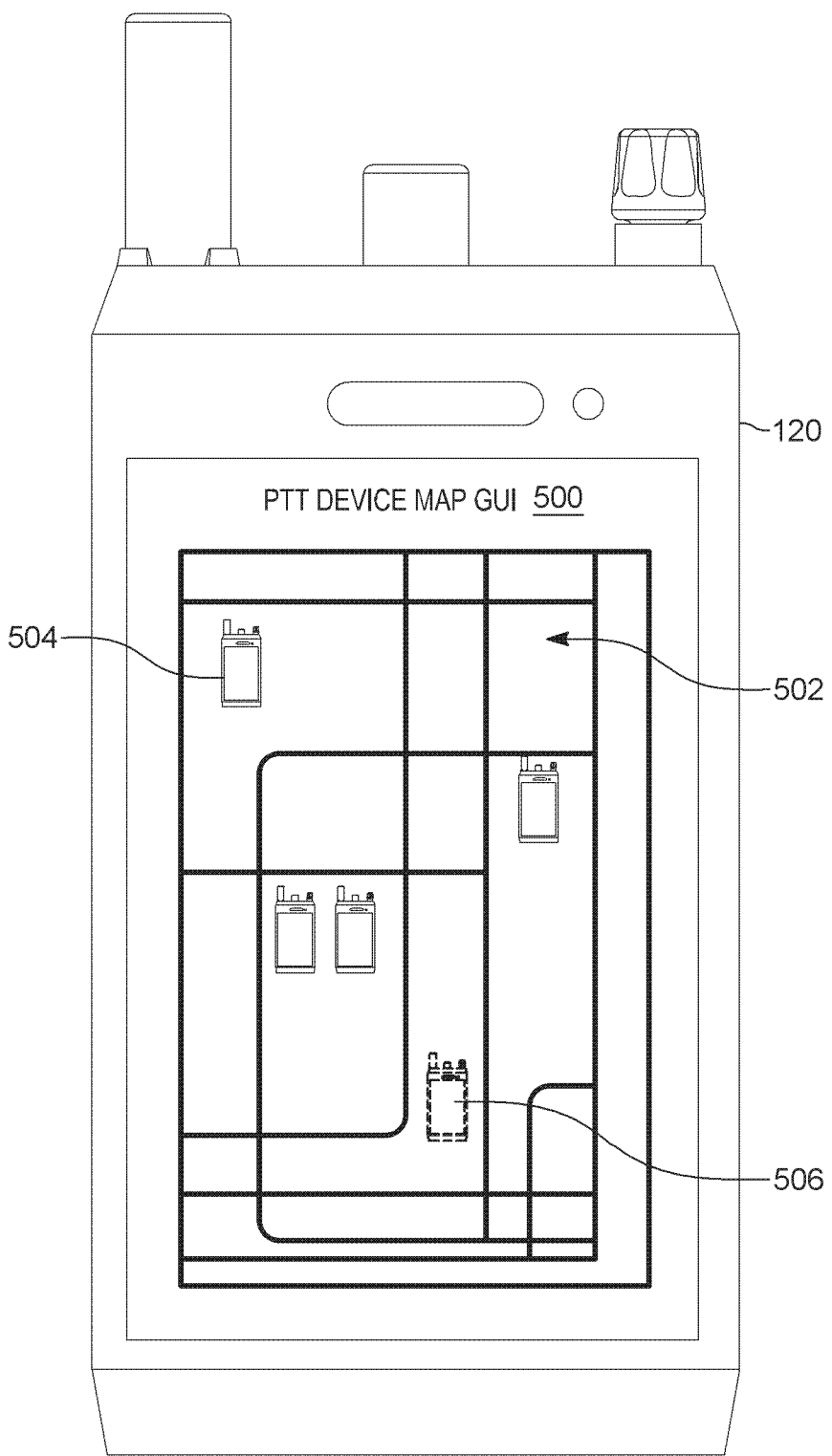
FIG. 5 is a schematic diagram of an example local PTT device running a map application that shows other local PTT devices and an emulated PTT device, in accordance with some examples.

Another public safety service supported by the local communication infrastructure 102 may include mapping or location tracking services of PTT devices. Thus, the local PTT devices 110 may be provided with location information about each of the other local PTT devices 110 in the vicinity 104 of the incident. This location information may also be tracked at a command center, dispatcher or operator computing device, police cruiser computing device, or on other device having access to the local communication infrastructure 102. In a particular example, each local PTT device 110 may include functionality to display a map of its general vicinity that includes representations of the locations of nearby local PTT devices 110 (e.g., displayed as an icon on the map). In such examples, the server 130 may transmit instructions to the local communication infrastructure 102 to cause the local PTT devices 110 to display a representation of the emulated PTT device 134 with an indication that the emulated PTT device is a proxy for the remote PTT device 120. In other words, the emulated PTT device 134 may be made to appear different from PTT devices that are physically present. For example, FIG. 5, described below shows a graphical user interface (GUI) 500 of a local PTT device running a map application that shows the locations of other local PTT devices 110 represented as PTT device icons, and that further shows the location of the emulated PTT device 134 represented as a stylized PTT device icon (e.g., a PTT device icon in dashed lines). The GUI 500 of FIG. 5 is described in greater detail below.

Figure 4:
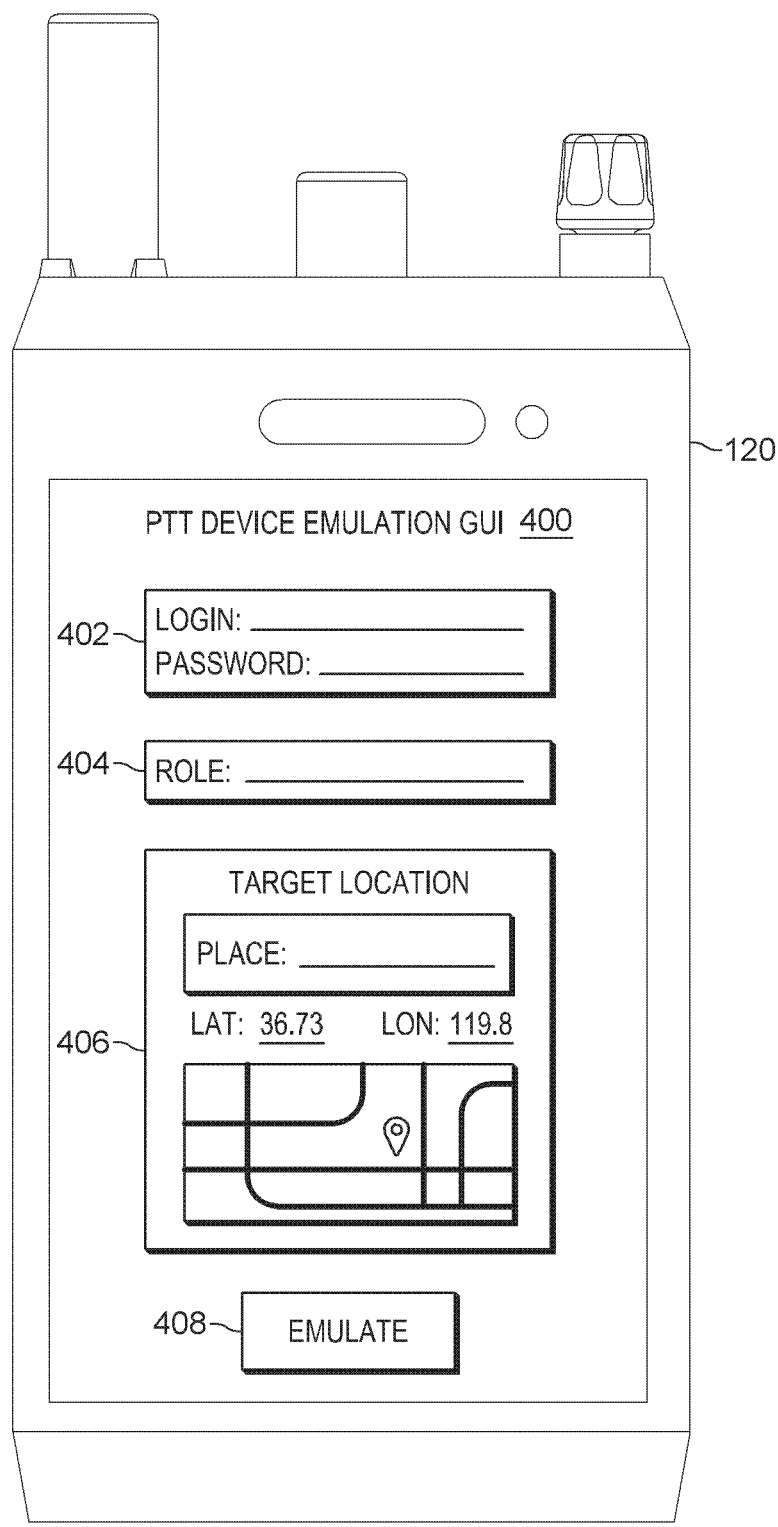
FIG. 4 is a schematic diagram of an example remote PTT device running a graphical user interface to request emulation of the remote PTT device at a target location, in accordance with some examples.

In some examples, the emulation request 122 may be made at the remote PTT device 120 through a graphical user interface (GUI) 400, for example, as shown in FIG. 4, described below. Thus, the target location 108 may be selected directly at the remote PTT device 120. The GUI 400 of FIG. 4 is described in greater detail below.

In some examples, emulation of the remote PTT device 120 as the emulated PTT device 134 may be combined with a virtual reality or augmented reality experience. A user of the remote PTT device 120 may use a virtual reality device (e.g. virtual reality headset) to sign into a virtual reality environment that provides a virtual experience of the incident. Through the virtual reality device, the user of the remote PTT device 120 may receive a video feed, or animated visual representation, of the incident location. In such examples, the remote PTT device 120 may serve as a companion device to the virtual reality device: in addition to experiencing a simulation of the incident through the virtual reality device, the user of the remote PTT device 120 may use their remote PTT device 120 to communicate with local PTT devices 110 as if the remote PTT device 120 were actually at the incident, thereby further enhancing the realism of the virtual reality experience.

In virtual reality applications, the target location 108 may correspond to a virtual location in a virtual environment. That is, the target location 108 may be based on the virtual location of the user of the remote PTT device 120. In such examples, the server 130 may receive an indication that an account linked to the remote PTT device 120 (i.e., controlled by the user of the remote PTT device 120) is signed into a virtual reality environment. The server 130 may receive from the virtual reality device a virtual location in the virtual reality environment occupied by the account (i.e., a location of the user in the virtual environment), and thereby determine the target location 108 based on the virtual location.

The emulated PTT device 134 may virtually "move" about the vicinity 104 upon request or instruction by the remote PTT device 120. That is, the local communication infrastructure 102 may update the registered location of the emulated PTT device 134 based on information received from the remote PTT device 120. Updates to the registered location of the emulated PTT device 134 may be transmitted from the remote PTT device 120 through a GUI (e.g., similar to the GUI shown in FIG. 4) by the selection of a new target location 108, or by a movement input (e.g., "move 10 feet west"), from which an updated target location 108 may be determined. In examples in which the user of the remote PTT device 120 is engaged in a virtual reality experience, updates to the registered location of the emulated PTT device 134 may be transmitted pursuant to the virtual reality program. That is, as the user of the remote PTT device 120 moves in the virtual environment, the virtual reality device or the remote PTT device 120 may send updated location information to the server 130 and/or local communication infrastructure 102, which may subsequently update the registered location of the emulated PTT device 134. Thus, the virtual location of the user of the remote PTT device 120 may be synchronized with the emulated location of the emulated PTT device 134 as registered at the local communication infrastructure 102.

The virtual environment representation of the incident location may include virtual geofences which correspond to actual geofences in the real world as supported by the local communication infrastructure 102. As the user of the remote PTT device 120 moves in the virtual environment, the virtual representation of the user may cross a boundary in the virtual environment that corresponds to a geofence in the real world. When this occurs, the local communication infrastructure 102 may update the registration of the emulated PTT device 134 accordingly pursuant to a geofence-crossing action (e.g., to update which geofences the emulated PTT device 134 is within, to update which talk groups the emulated PTT device 134 is a member of, etc.).

In some examples, the virtual representation of the user of the remote PTT device 120 may move into an area which corresponds to an area in the real world which is supported by a different set of communication infrastructure than the local communication infrastructure 102. In such examples, the server 130 may update its selection of local communication infrastructure 102 to which the emulated PTT device 134 is to be registered. For example, as the user of the remote PTT device 120 travels in the virtual world from the east end of a city to the west end of the city, the emulated PTT device 134 may be removed from registration in the local communication infrastructure 102 that supports the east end of the city, and registered at the local communication infrastructure 102 that supports the west end of the city.

Other features for PTT devices supported by the local communication infrastructure 102 may be similarly applied to the emulated PTT device 134, including dynamic regrouping events, and other features.

Thus, a remote PTT device 120 may be emulated at an incident location as an emulated PTT device 134 so that the remote PTT device 120 may operate with the local communication infrastructure 102 as if it were physically present at the incident location. Emulation of the remote PTT device 120 at the incident location provides for the seamless integration with the local communication infrastructure 102 that supports local PTT devices 110 involved in responding to the incident, thereby addressing personnel resourcing issues and improving cooperation of remote personnel with on-scene first responders.

Figure 2:
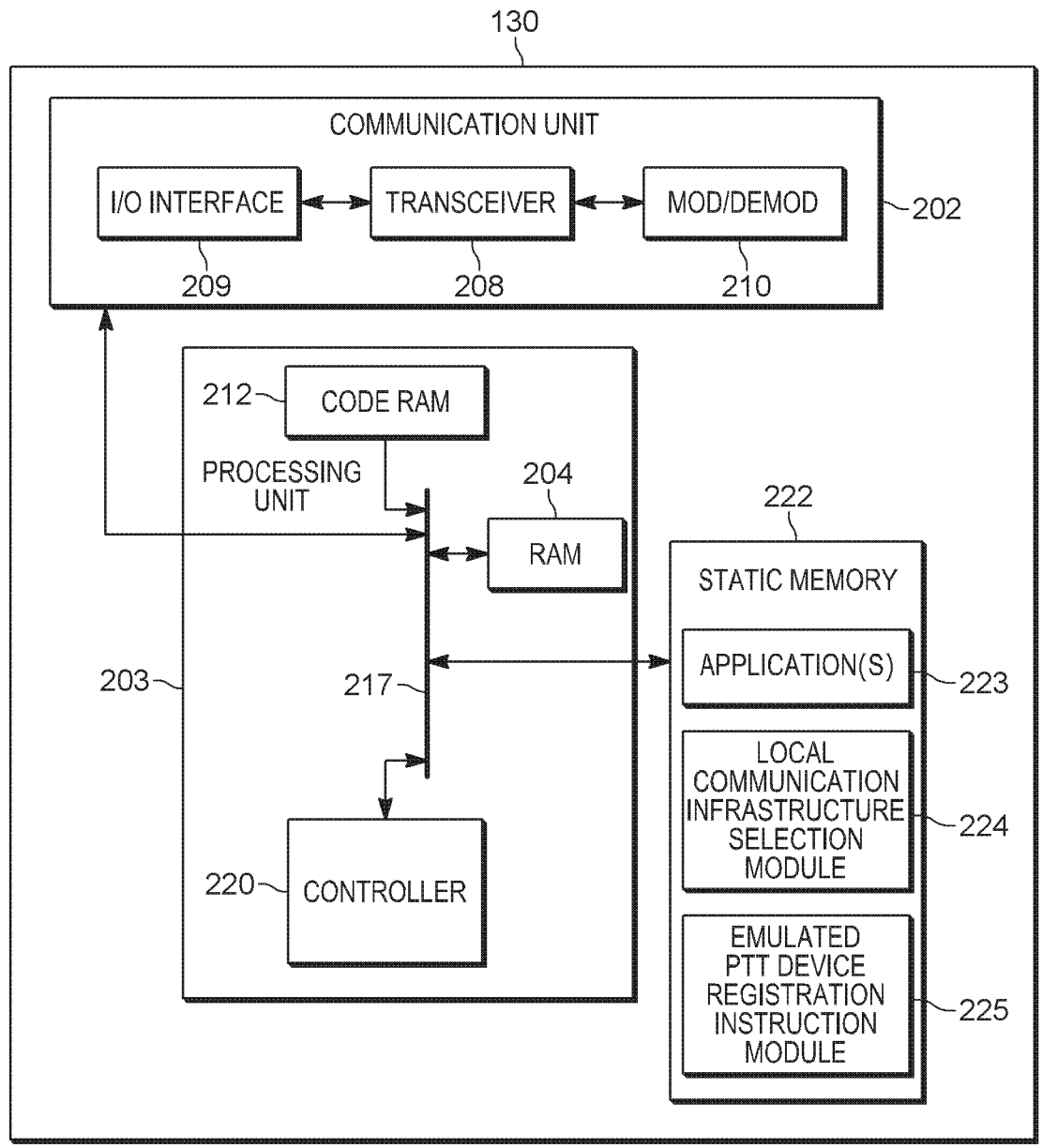
FIG. 2 is a device diagram showing a device structure of a server for emulating a PTT device at an incident location, in accordance with some examples.

Attention is next directed to FIG. 2, which is a device diagram of an example of the server 130 of FIG. 1. In general, the server 130 may comprise one or more servers and/or one or more cloud computing devices, and the like, configured to communicate with the remote PTT device 120 and the local communication infrastructure 102.

As depicted, the server 130 comprises: a communication unit 202, a processing unit 203, a Random-Access Memory (RAM) 204, one or more wireless transceivers 208, one or more wired and/or wireless input/output (I/O) interfaces 209, a combined modulator/demodulator 210, a code Read Only Memory (ROM) 212, a common data and address bus 217, a controller 220, and a static memory 222 storing at least one application 223. Hereafter, the at least one application 223 will be interchangeably referred to as the application 223.

The server 130 includes the communication unit 202 communicatively coupled to the common data and address bus 217 of the processing unit 203.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory 204 and the static memory 222.

The communication unit 202 may include one or more wired and/or wireless input/output (I/O) interfaces 209 that are configurable to communicate with the remote PTT device 120 and/or the local communication infrastructure 102. For example, the communication unit 202 may include one or more transceivers 208 and/or wireless transceivers for communicating with the remote PTT device 120 and/or the local communication infrastructure 102. Hence, the one or more transceivers 208 may be adapted for communication with one or more communication networks used to communicate with the remote PTT device 120 and/or the local communication infrastructure 102. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP (3rd Generation Partnership Project) networks, a 5G network (e.g. a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication unit 202 may optionally include one or more wireline transceivers, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The controller 220 may include ports (e.g. hardware ports) for coupling to other hardware components.

The controller 220 may include one or more logic circuits, one or more processors, one or more microprocessors, and/or the controller 220 may include one or more ASIC (application-specific integrated circuits) and one or more FPGA (field-programmable gate arrays), and/or another electronic device. In some examples, the controller 220 and/or the server 130 is not a generic controller and/or a generic device, but a device specifically configured to implement functionality for emulating a PTT device at an incident location. For example, in some examples, the server 130 and/or the controller 220 specifically comprises a computer executable engine configured to implement functionality for emulating a PTT device at an incident location.

The static memory 222 is a non-transitory machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine readable instructions) that implement the functional teachings of the server 130 as described herein are maintained, persistently, at the memory 222 and used by the controller 220 which makes appropriate utilization of volatile storage during the execution of such programming instructions.

As depicted, the memory 222 further stores an local communication infrastructure selection module 224 and an emulated PTT device registration instruction module 225, which may be used by the server 130 and/or the controller 220 while implementing the application 223.

Figure 3:
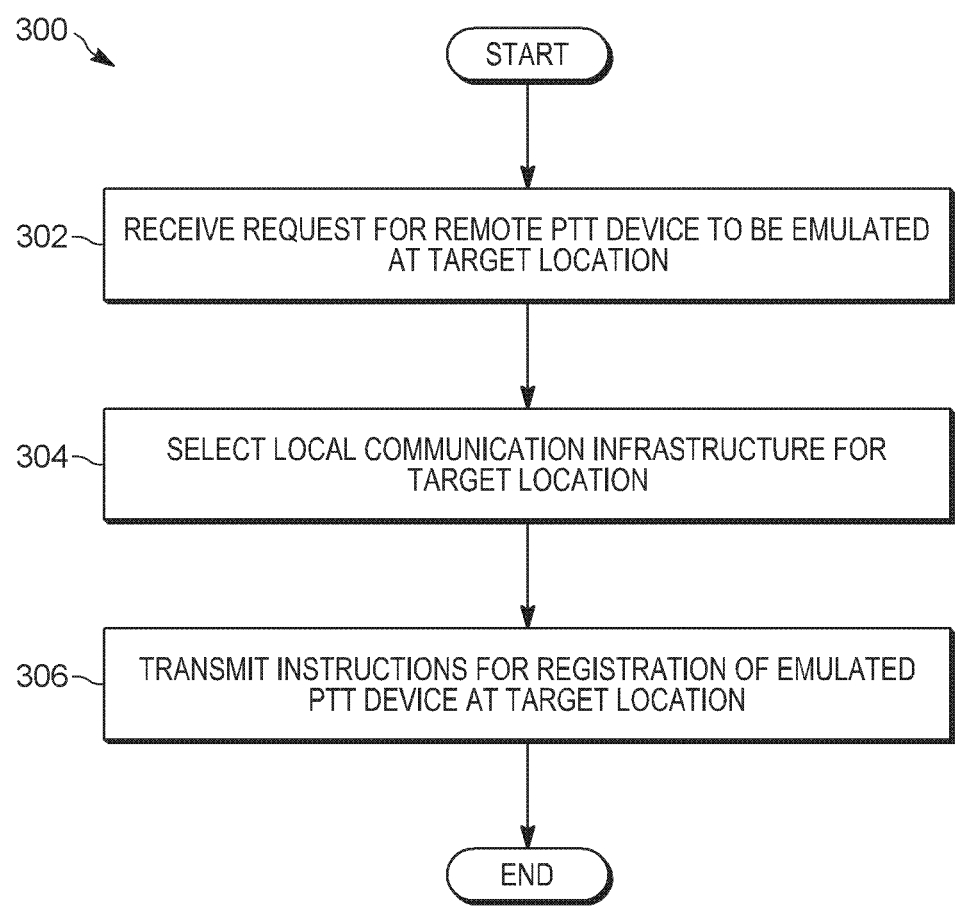
FIG. 3 is a flowchart of a method for emulating a PTT device at an incident location, in accordance with some examples.

In particular, the memory 222 stores instructions corresponding to the at least one application 223 (and which may include local communication infrastructure selection module 224 and Emulated PTT device registration instruction module 225) that, when executed by the controller 220, enables the controller 220 to implement functionality for remote PTT device emulation including, but not limited to, the blocks of the method 300 set forth in FIG. 3.

In illustrated examples, when the controller 220 executes the one or more applications 223, the controller 220 is enabled to: receive a request 122 for a remote PTT device 120 to be emulated at a target location 108 in a vicinity 104 of an incident; select local communication infrastructure 102 that supports public safety services for local PTT devices 110 located near the target location 108; and transmit, to the local communication infrastructure 102, instructions 132 for the local communication infrastructure 102 to register an emulated PTT device 134 as a proxy for the remote PTT device 120 at the target location 108.

In some examples, the controller 220 executing the application 223 may receive the request 122 for the remote PTT device 120 to be emulated at the target location 108 from the remote PTT device 120, the request 122 generated through a user interface at the remote PTT device 120.

In some examples, the controller 220 executing the application 223 may route communication between the remote PTT device 120 and a talk group to which the emulated PTT device 134 is registered.

In some examples, controller 220 executing the application 223 may transmit to the local communication infrastructure 102 an actual location of the remote PTT device 120, wherein transmission of the actual location of the remote PTT device 120 is to cause the local communication infrastructure 102 to route communication between the remote PTT device 120 and a talk group to which the emulated PTT device 134 is registered through remote communication infrastructure located near the remote PTT device 120.

Further, the controller 220 executing the application 223 may use the emulated PTT device registration instruction module 225 to transmit to the local communication infrastructure 102 instructions for the local communication infrastructure 102 to register the emulated PTT device 134 as having a designated role (e.g. incident commander) in a talk group to which the emulated PTT device 134 is registered. The designated role may include a talk group priority of the emulated PTT device 134 in the talk group. In some examples, the controller 220 executing the application 223 may use the emulated PTT device registration instruction module 225 to transmit to the local communication infrastructure 102 instructions to cause a local PTT device 110 (or a command center display terminal or other device) to display a representation of the emulated PTT device 134 with an indication that the emulated PTT device 134 is a proxy for the remote PTT device 120 (e.g., a special icon for PTT devices that are emulated).

As described above with reference to the system 100 of FIG. 1, emulation of the remote PTT device 120 as the emulated PTT device 134 may be combined with a virtual reality or augmented reality experience. In such examples, the controller 220 executing the application 223 may use the local communication infrastructure selection module 224 to receive an indication that an account linked to the remote PTT device 120 is signed into a virtual reality environment, to receive from a virtual reality device a virtual location in the virtual reality environment occupied by the account, and determine the target location 108 based on the virtual location. In some examples, the controller 220 executing the application 223 may use the local communication infrastructure selection module 224 to receive from the virtual reality device an updated virtual location, determine an updated location for the emulated PTT device 134 based on the updated virtual location, determine whether the updated location is across a geofence set out by the local communication infrastructure 102, and upon determining that the updated location is across the geofence, trigger a geofence-crossing action. The geofence-crossing action may include updating selection of the local communication infrastructure 102 to which the emulated PTT device 134 is registered, or may include updating selection of a talk group of which the emulated PTT device 134 is registered as a member.

FIG. 3 is a flowchart of a method 300 for emulating a PTT device at an incident location. For convenience, the method 300 is described Attention is next directed to FIG. 4, which is a flowchart representative of a method 300 for emulating a PTT device at an incident location. The operations of the method 300 of FIG. 3 correspond to machine readable instructions that are executed by the server 130, and specifically the controller 220 of the server 130. In the illustrated example, the instructions represented by the blocks of FIG. 4 are stored at the memory 222 for example, as the application 223. The method 300 of FIG. 3 is one way in which the controller 220 and/or the server 130 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the components of method 300 are referred to herein as "blocks" rather than "steps." The method 300 of FIG. 3 may be implemented on variations of the system 100 of FIG. 1, as well.

At block 302, the server 130 receives a request 122 for the remote PTT device 120 to be emulated at the target location 108 in the vicinity 104 of the incident. The request 122 for the remote PTT device 120 to be emulated at the target location 108 may be received from the remote PTT device 120, the request 122 generated through a user interface at the remote PTT device 120.

At block 304, the server 130 selects local communication infrastructure 102 that supports public safety services for local PTT devices 110 located near the target location 108. The public safety services may include a talk group for local PTT devices 110 located near the target location 108, and registration of the remote PTT device 120 at the target location 108 may cause the local communication infrastructure 102 to register the emulated PTT device 134 as a member of the talk group. In some examples, the method 300 may further involve the server 130 transmitting to the local communication infrastructure 102 an actual location of the remote PTT device 120, wherein transmission of the actual location of the remote PTT device 120 causes the local communication infrastructure 102 to route communication between the remote PTT device 120 and the talk group through remote communication infrastructure located near the remote PTT device 120. In some examples, the method 300 may further involve the server 130 routing communication between the remote PTT device 120 and the talk group.

In some examples, the method 300 may further involve the server 130 transmitting to the local communication infrastructure 102 instructions for the local communication infrastructure 102 to register the emulated PTT device 134 as having a designated role in the talk group, the designated role including a talk group priority of the emulated PTT device 134 in the talk group.

At block 306, the server 130 transmits to the local communication infrastructure 102 instructions 132 for the local communication infrastructure 102 to register the emulated PTT device 134 as a proxy for the remote PTT device 120 at the target location 108.

As described above with reference to the system 100 of FIG. 1, emulation of the remote PTT device 120 as the emulated PTT device 134 may be combined with a virtual reality or augmented reality experience. In such examples, the method 300 may further involve, prior to the server 130 selecting the local communication infrastructure 102, the server 130 receiving an indication that an account linked to the remote PTT device 120 is signed into a virtual reality environment, the server 130 receiving from a virtual reality device a virtual location in the virtual reality environment occupied by the account, and the server 130 determining the target location 108 based on the virtual location. In some examples, the method 300 may further involve the server 130 receiving from the virtual reality device an updated virtual location, the server 130 determining an updated location for the emulated PTT device 134 based on the updated virtual location, the server 130 determining whether the updated location is across a geofence set out by the local communication infrastructure 102, and the server 130, upon determining that the updated location is across the geofence, triggering, a geofence-crossing action. The geofence-crossing action may include updating selection of the local communication infrastructure 102 to which the emulated PTT device is registered, or may include updating selection of a talk group of which the emulated PTT device 134 is registered as a member.

The method 300 may further involve the server 130 transmitting to the local communication infrastructure 102 instructions to cause a local PTT device 110 (or a command center display terminal or other device) to display a representation of the emulated PTT device 134 with an indication that the emulated PTT device 134 is a proxy for the remote PTT device 120 (e.g., a special icon for PTT devices that are emulated).

Attention is next directed to FIG. 4, which depicts a graphical user interface (GUI) 400 for PTT device emulation, executable by the remote PTT device 120 to initiate the request 122 for the remote PTT device 120 to be emulated at the target location 108.

The GUI 400 includes a login selection component 402 to select an account with which to make the request 122. The GUI 400 further includes a role selection component 404 with which to select a designated role for the emulated PTT device 134 to adopt. The GUI 400 further includes a target location selection component 406 with which to select the target location 108. The target location selection component 406 may include a place selection component through which a place (e.g., city, landmark) may be selected as the target location 108, a coordinate selection component through which a set of coordinates (e.g., global positioning system (GPS) coordinates) may be selected as the target location 108, and/or a map interface through which a marker may be dropped to select the target location 108. The GUI 400 further includes an emulation button 408 which, by selection thereof, initiates transmission of the request 122 for the remote PTT device 120 to be emulated at the target location 108, as described herein.

Attention is next directed to FIG. 5, which depicts a GUI 500 to display a map of PTT devices in an area, executable by a local PTT device 110 (or command center terminal, dispatcher terminal, and the like) to display graphical representations of PTT devices in the area. The GUI 500 includes a map 502 of the area on which icons 504, 506, depicting PTT devices are displayed. The icons 504 represent PTT devices that are physically present in the area (e.g., local PTT devices 110). The icons 506 represent PTT devices that are emulated in the area (e.g., the remote PTT device 120). The representation of the remote PTT device 120 is visually distinct from the representations of the local PTT devices 110. For example, the icon 506 may be a different icon than the icon 504. As another example, as shown, the icon 506 may be shown as a stylized version of the icon 504 (e.g., highlighted, shaded, shown in dashed lines). Thus, users of local PTT devices 110 (or command center, dispatcher terminal, and the like) may be aware of which PTT devices in the area are physically present versus which PTT devices in the area are emulated.

Figure 6:
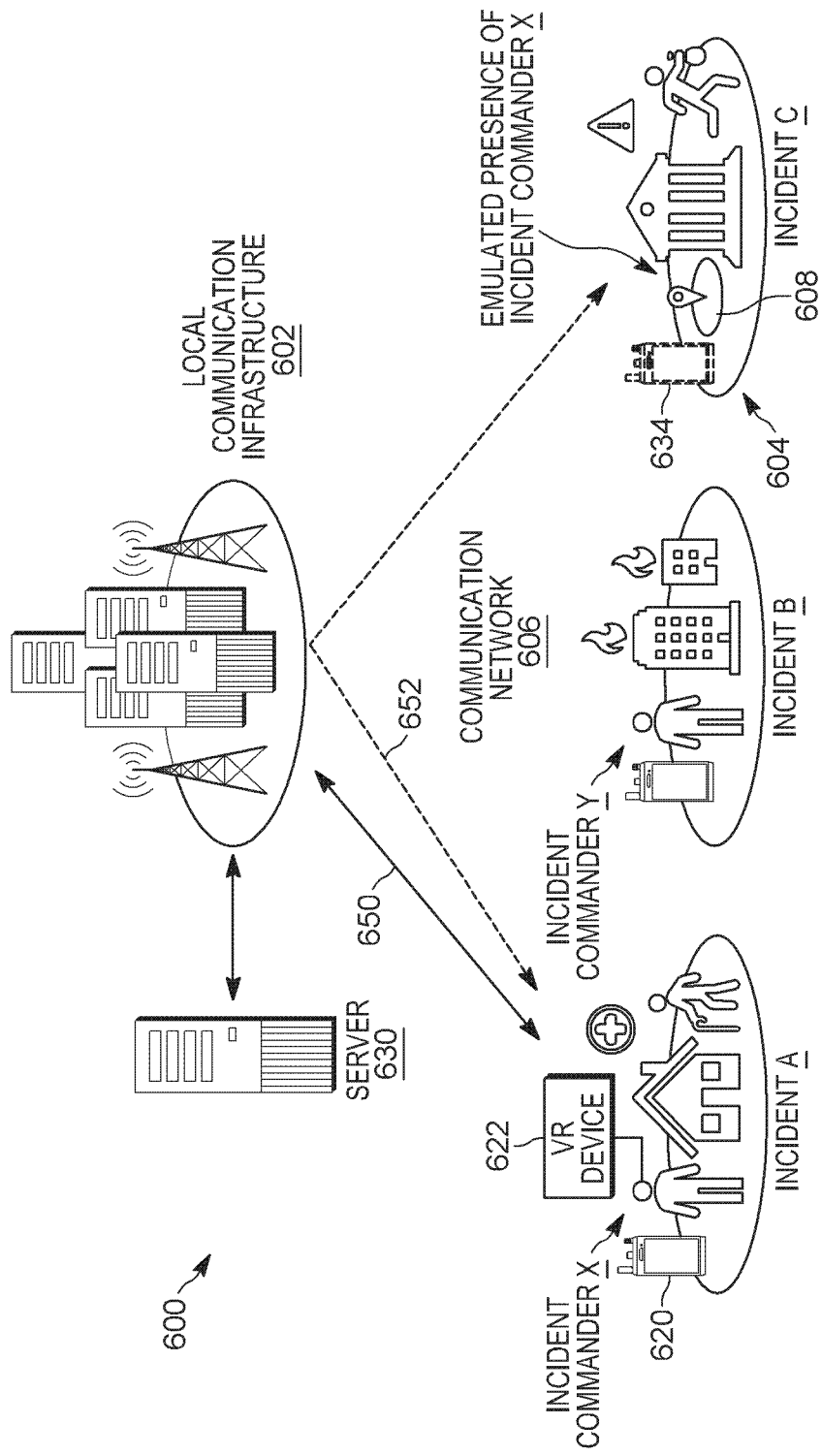
FIG. 6 is a schematic diagram illustrating a system for emulating a PTT device of an incident commander at an incident location, in accordance with some examples.

Attention is next directed to FIG. 6, which illustrates the system 600 for emulating a PTT device of an incident commander at an incident. The system 600 is similar to the system 100 of FIG. 1, and includes components numbered in the "600" series rather than the "100" series. The system 600 includes a local communication infrastructure 602 that supports a communication network 606 to provide public safety services for PTT devices in a vicinity 604 of an incident, a target location 608, a remote PTT device 120, a server 630, and an emulated PTT device 634. For further description of these components, referenced may be had to the description of the like components of the system 100 of FIG. 1.

The system 600 further includes an incident commander X who is physically present at incident A (a medical incident), an incident commander Y who is physically present at incident B (a fire incident), and the system 600 further includes an incident C (a law enforcement incident), however, there is no incident commander physically within the vicinity 604 of the incident C.

The incident commander X controls the remote PTT device 120. The incident commander X may be particularly well suited to assist with management of the incident C, but the incident C may be prohibitively distant from the incident A for the incident commander X to be able to travel to the incident C. As described above (e.g. with reference to the system 100 of FIG. 1), the incident commander X may cause the remote PTT device 620 to transmit a request to the server 630 for the emulation of the remote PTT device 620 at the target location 608 in the vicinity 604 of incident C so that the incident commander X may assist with management of the incident C.

The server 630 may then select the local communication infrastructure 602 and cause the local communication infrastructure 602 to register the emulated PTT device 634 as a proxy for the remote PTT device 620 at the target location 608. Thus, the remote PTT device 620 may participate in communications with any talk groups in the vicinity 604 of the incident C, interact with any geofences in the vicinity 604 of the incident C, and otherwise cooperate with other PTT devices in the vicinity 604 of the incident C as described herein. In other words, an emulated presence of the incident command X is generated at the location of incident C.

The remote PTT device 620 may continue to receive communications 650 from talk groups of which the remote PTT device 620 is a member by virtue of its actual physical location (indicated as communications 650), while the remote PTT device 620 receives communications 652 from talks groups of which the emulated PTT device 634 is a member by virtue of its emulated location at the target location 608 (indicated as communications 652). Thus, the incident commander X may multitask by managing the incident A and the incident X as needed.

The incident commander X may further control a virtual reality device 622, and thus, the incident commander X may engage in a virtual reality experience in which the virtual reality device 622 receives a video feed from the incident C (e.g. from cameras of first responders at the incident C or other video feeds), or may view a virtual representation of the incident C and its vicinity 604, to provide the incident commander X with information about the incident C. Further, as described herein, the incident commander X may move within the virtual reality environment, and movement within the virtual reality environment may cause the location of the emulated PTT device 634 to be updated, which may result in geofence-crossing actions.

Thus, as described herein, an incident commander or other specialist personnel who is remote from an incident may cooperate with first responders at the incident location through a remote PTT device as if the remote PTT device were physically present at the incident. The emulation of remote PTT device at an incident location provides for more seamless cooperation between remote personnel and on-scene first responders.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . ." and "one or more . . ." language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method comprising:
    receiving, at a server, a request for a remote push-to-talk (PTT) device to be emulated at a target location in a vicinity of an incident;
    selecting, at the server, local communication infrastructure that supports public safety services for local PTT devices located near the target location; and
    transmitting, from the server to the local communication infrastructure, instructions for the local communication infrastructure to register an emulated PTT device as a proxy for the remote PTT device at the target location.

2. The method of claim 1, wherein:
    the public safety services include a talk group for local PTT devices located near the target location; and
    registration of the remote PTT device at the target location is to cause the local communication infrastructure to register the emulated PTT device as a member of the talk group.

3. The method of claim 2, further comprising routing, through the server, communication between the remote PTT device and the talk group.

4. The method of claim 2, further comprising transmitting, from the server to the local communication infrastructure, an actual location of the remote PTT device, wherein transmission of the actual location of the remote PTT device is to cause the local communication infrastructure to route communication between the remote PTT device and the talk group through remote communication infrastructure located near the remote PTT device.

5. The method of claim 2, further comprising:
transmitting, from the server to the local communication infrastructure, instructions for the local communication infrastructure to register the emulated PTT device as having a designated role in the talk group, the designated role including a talk group priority of the emulated PTT device in the talk group.

6. The method of claim 1, further comprising, prior to selecting the local communication infrastructure:
receiving, at the server, an indication that an account linked to the remote PTT device signed into a virtual reality environment;
receiving, at the server, from a virtual reality device, a virtual location in the virtual reality environment occupied by the account; and
determining, at the server, the target location based on the virtual location.

7. The method of claim 6, further comprising:
receiving, at the server, from the virtual reality device, an updated virtual location;
determining, at the server, an updated location for the emulated PTT device based on the updated virtual location;
determining, at the server, whether the updated location is across a geofence set out by the local communication infrastructure; and
upon determining that the updated location is across the geofence, triggering, at the server, a geofence-crossing action.

8. The method of claim 7, wherein the geofence-crossing action comprises updating selection of the local communication infrastructure to which the emulated PTT device is registered.

9. The method of claim 1, further comprising:
transmitting, from the server to the local communication infrastructure, instructions to cause a local PTT device to display a representation of the emulated PTT device with an indication that the emulated PTT device is a proxy for the remote PTT device.

10. The method of claim 1, wherein the request for the remote PTT device to be emulated at the target location is received from the remote PTT device, the request generated through a user interface at the remote PTT device.

11. A server comprising:
a communication unit; and a controller configured to:
receive a request for a remote push-to-talk (PTT) device to be emulated at a target location in a vicinity of an incident;
select local communication infrastructure that supports public safety services for local PTT devices located near the target location; and
transmit, to the local communication infrastructure, instructions for the local communication infrastructure to register an emulated PTT device as a proxy for the remote PTT device at the target location.

12. The server of claim 11, wherein:
the public safety services include a talk group for local PTT devices located near the target location; and
registration of the remote PTT device at the target location is to cause the local communication infrastructure to register the emulated PTT device as a member of the talk group.

13. The server of claim 12, wherein the controller is further configured to:
route, through the server, communication between the remote PTT device and the talk group.

14. The server of claim 12, wherein the controller is further configured to:
transmit, from the server to the local communication infrastructure, an actual location of the remote PTT device, wherein transmission of the actual location of the remote PTT device is to cause the local communication infrastructure to route communication between the remote PTT device and the talk group through remote communication infrastructure located near the remote PTT device.

15. The server of claim 12, wherein the controller is further configured to:
transmit, from the server to the local communication infrastructure, instructions for the local communication infrastructure to register the emulated PTT device as having a designated role in the talk group, the designated role including a talk group priority of the emulated PTT device in the talk group.

16. The server of claim 11, wherein the controller is further configured to, prior to selecting the local communication infrastructure:
receive, at the server, an indication that an account linked to the remote PTT device signed into a virtual reality environment;
receive, at the server, from a virtual reality device, a virtual location in the virtual reality environment occupied by the account; and
determine, at the server, the target location based on the virtual location.

17. The server of claim 16, wherein the controller is further configured to:
receive, at the server, from the virtual reality device, an updated virtual location;
determine, at the server, an updated location for the emulated PTT device based on the updated virtual location;
determine, at the server, whether the updated location is across a geofence set out by the local communication infrastructure; and
upon determining that the updated location is across the geofence, trigger, at the server, a geofence-crossing action.

18. The server of claim 17, wherein the geofence-crossing action comprises updating selection of the local communication infrastructure to which the emulated PTT device is registered.

19. The server of claim 11, wherein the controller is further configured to: transmit, from the server to the local communication infrastructure, instructions to cause a local PTT device to display a representation of the emulated PTT device with an indication that the emulated PTT device is a proxy for the remote PTT device.

20. The server of claim 11, wherein the request for the remote PTT device to be emulated at the target location is received from the remote PTT device, the request generated through a user interface at the remote PTT device.

\* \* \* \* \*